IDENTIFICATION OF A SUBSCRIBER'S REQUEST FOR SERVICE

Filed Nov. 22, 1966 2 Sheets-Sheet 1

INVENTORS
R. L. FLINDALL
L. R. LAE
BY Curphey & Erickson
PATENT AGENTS

IDENTIFICATION OF A SUBSCRIBER'S REQUEST FOR SERVICE

Filed Nov. 22, 1966

PROPOSED HOLD-OFF NORMAL ASSEMBLY

INVENTORS
R. L. FLINDALL
L. R. LAE
BY Curphey & Erickson
PATENT AGENTS

United States Patent Office 3,482,056

Patented Dec. 2, 1969

3,482,056

IDENTIFICATION OF A SUBSCRIBER'S REQUEST FOR SERVICE

Robert Lacey Flindall and Leif Ragnar Lae, Brampton, Ontario, Canada, assignors to Northern Electric Company Limited, Montreal, Quebec, Canada Filed Nov. 22, 1966, Ser. No. 596,108
Int. Cl. H04m *3/02*
U.S. Cl. 179—18 1 Claim

ABSTRACT OF THE DISCLOSURE

A double-winding hold magnet on a crossbar switch also operates as a line relay.

This invention relates to an improvement in an automatic telephone exchange using crossbar switches which eliminates the need of line relays which were heretofore provided one for each subscriber's line.

In the present telephone switching systems, a line relay is used for initiating the identification of a request for service from a subscriber. However one line relay must be used for each subscriber's line and it is very costly. Consequently it would be desirable to identify a subscriber's request by some other means.

The identification of a request for service from a subscriber is provided, in accordance with the invention, by a novel arrangement of the vertical unit portion of the crossbar switch on which the subscriber's line is terminated. The hold magnet which operates the vertical unit is equipped with two operating windings which cooperate to perform both the functions of the line relay and the regular function of the hold magnet. The above eliminates the need for a separate line relay and represents a great saving of space and money.

The invention will now be described with reference to the drawings in which.

Figure 1:
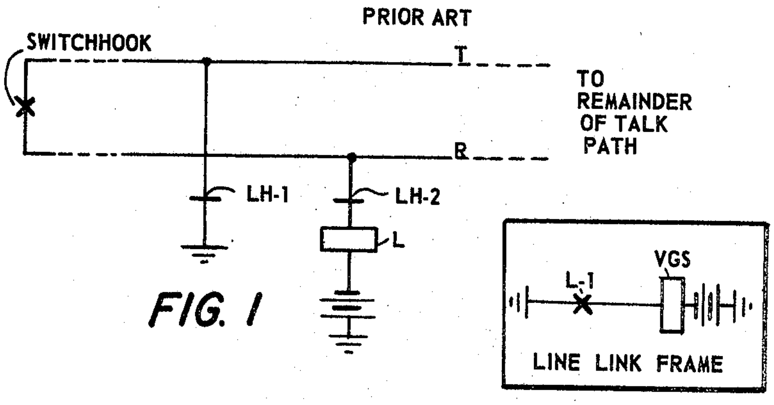
FIGURE 1 is a circuit illustrating the existing line relay and the associated circuit for initiating identification of a subscriber's request for service.

Referring to FIGURE 1, when a subscriber lifts his telephone handset, the switchhook associated with the handset closes the subscriber's loop and provides ground for operating the line relay L associated with the calling subscriber's line. Line relay L operates through normally closed contacts LH–1 and LH–2 of the hold magnet which operates the vertical unit of the crossbar switch where the calling subscriber is located. The crossbar switch is well known in the art and a description thereof may be found in "The Design of Switching Circuit" by Keister et al. published by D. Van Nostrand Co.

The operation of the line relay L operates a set of contacts L–1 which make ground available to the vertical group start relay VGS and operate it. Relay VGS is individual to each vertical group of fifty lines on a line link frame and is operated in response to the initiation of a call by any one of the fifty lines for initiating the identification of the calling line. The circuitry involved in processing the request for service is well known in the art and may be found for example, in FIGURES 2, 5 and 6 of U.S. Patent 2,585,904 issued to A. J. Busch on Feb. 19, 1952.

Also in accordance with the teaching of the Busch patent when the location of the calling subscriber has been determined by the dial tone marker and an idle path to an idle originating register has been established, the vertical unit hold magnet associated with the subscriber is energized. The break contacts LH–1 and LH–2 of the hold magnet of the crossbar switch where the subscriber is located will then break the ground path to the line relay L and the line relay L will release. The release of the relay L will open contacts L–1 and deenergize relay VGS.

Figure 2:
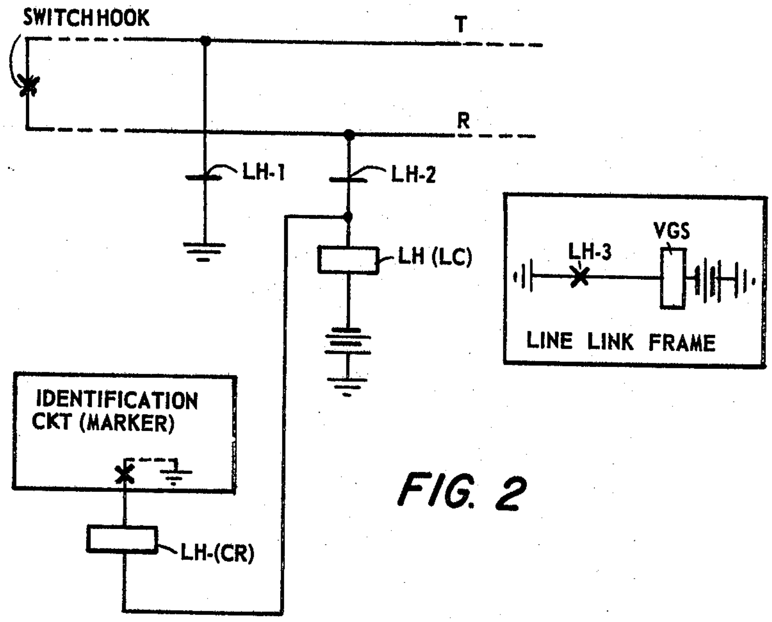
FIGURE 2 illustrates the circuit in accordance with the invention for initiating identification of a subscriber's request for service.

In accordance with the invention, the provision of the ground to the vertical group relay VGS which initiates the processes for identifying the calling subscriber is accomplished through the use of a novel arrangement of the hold magnet of the vertical unit of the crossbar switch. Referring to FIGURE 2, when the switchhook of the subscriber's handset is closed the winding LC of the hold magnet LH is energized through normally closed contacts LH–1 and LH–2 of the hold magnet. The energization of winding LC causes the armature to move to a mid-position determined by a mechanical stop illustrated schematically in the center diagram of FIGURE 3 and the ampere turns of the LC winding. The armature movement causes the lower contacts LH–3 to close thus energizing the VGS relay, FIGURE 2, and performing the function which was previously performed by the line relay L. When the location of the calling subscriber has been determined by the dial tone marker and an idle path to an idle originating register has been established, the vertical unit hold magnet winding CR is also energized. The circuit for energization of winding CR is well known in the art and is labelled "Identification Circuit." It may be found for example in column 52 lines 58–75 and column 53 lines 1 through 10 of the above identified patent. This increase in ampere turns causes the armature to move to the fully operated position shown at the bottom of FIGURE 3. In this final position contacts LH–1 and LH–2 are opened thereby releasing winding LC. Contacts LH–3 are also opened thereby releasing the vertical group start relay VGS and completing the function previously performed by the line relay L.

Figure 3:
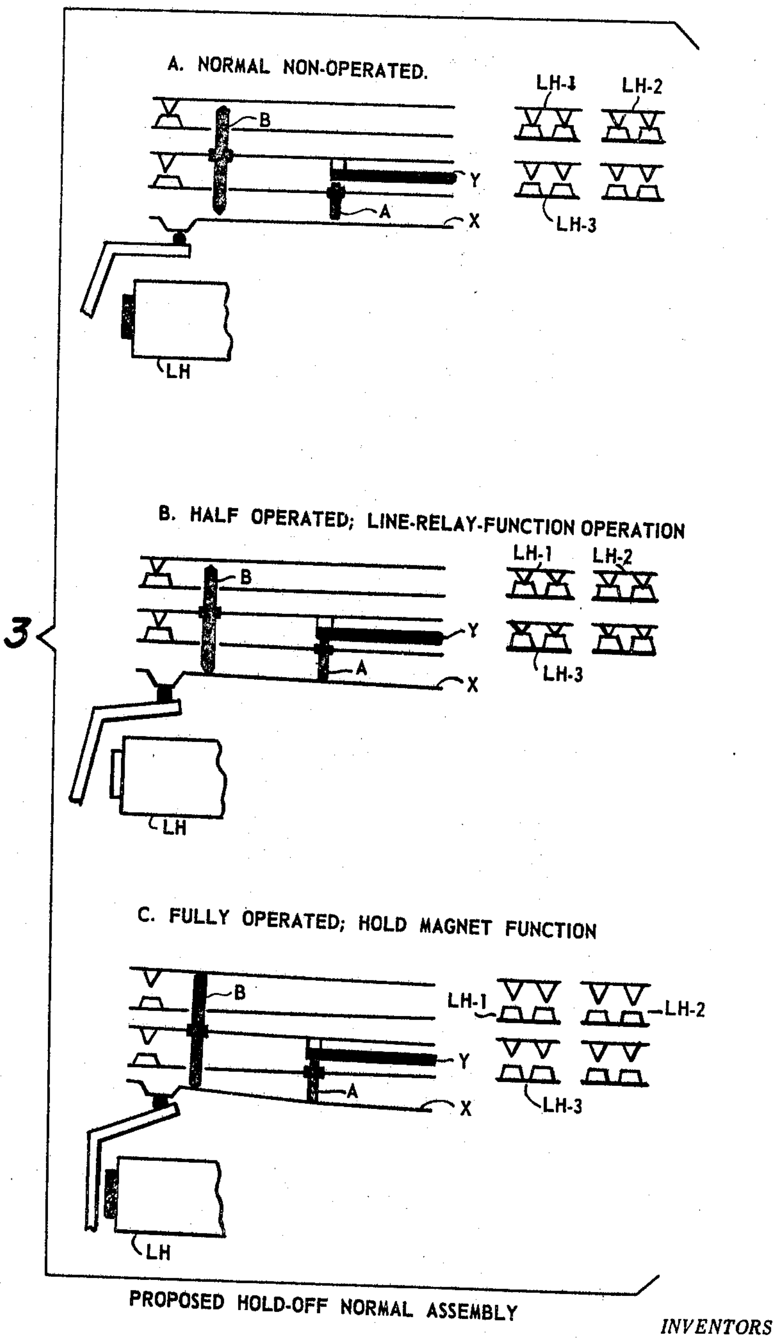
FIGURE 3 illustrates in schematic form the hold magnet contact assembly for use with the invention.

FIGURE 3 illustrates in diagrammatic form the type of switch that may be used to perform the function described above. In the non-operated position, contacts LH–1 and LH–2 are closed and contacts LH–3 are opened.

When winding LC (not shown) of hold magnet LH is operated, its armature is moved to a mid-position as illustrated schematically in the center diagram of FIGURE 3. In such a position the armature is prevented to move any further because of mechanical stop "Y" against which stud A secured to the lower spring LH–3 abuts and because of the ampere turns of the hold magnet. When the hold magnet is fully operated the ampere turns are sufficient to bend actuator X which bears against stud B secured to the upper spring of contacts LH–3. Stud B opens contacts LH–1 and LH–2.

What is claimed is:

1. In a switching system in which subscriber's lines are terminated on the vertical unit of a crossbar switch and in which a vertical group start relay is used for initiating the identification of a request for service the combination comprising (a) a hold magnet having a first and a second winding on each vertical unit of the crossbar switch;

(b) means for energizing the first winding of the hold magnet to move the armature thereof to a mid-position in response to closure of the subscriber's loop, the operation of the hold magnet to said mid-position energizing the vertical group start relay for initiating the request of the calling subscriber for service; and (c) means for energizing the second winding of the hold magnet to fully operate the armature of the hold magnet when the subscriber has been identified, the operation of said hold magnet to its fully operated position opening the energizing circuit of the vertical group relay.

References Cited

UNITED STATES PATENTS

| | | | |
|---|---|---|---|
| 2,199,543 | 5/1940 | Lomax | 179—18.3 X |
| 2,277,191 | 3/1942 | Wilbur | 179—18.3 |
| 2,972,020 | 2/1961 | Nogami et al. | 335—112 |

WILLIAM C. COOPER, Primary Examiner

U.S. Cl. X.R.

335—112